United States Patent [19]

Kawamura

[11] Patent Number: 4,896,829
[45] Date of Patent: Jan. 30, 1990

[54] AIR CIRCULATION SYSTEM FOR THERMOSTATIC CHAMBER

[75] Inventor: Hideo Kawamura, Samukawa, Japan

[73] Assignee: Isuzu Motors Limited, Tokyo, Japan

[21] Appl. No.: 290,280

[22] Filed: Dec. 27, 1988

[30] Foreign Application Priority Data

Dec. 30, 1987 [JP] Japan ................. 62-335970

[51] Int. Cl.$^4$ ............................ G05D 23/00
[52] U.S. Cl. .................. 237/2 A; 237/12.3 A
[58] Field of Search ............ 237/2 A, 12.3 R, 12.3 A, 237/12.3 B; 165/41, 42; 98/2.01

[56] References Cited

U.S. PATENT DOCUMENTS 4,613,072 9/1986 Kikuchi et al.

FOREIGN PATENT DOCUMENTS 459713 8/1972 Australia.
435344 10/1967 China.
0041840 12/1981 European Pat. Off.
61-11118 9/1986 Japan.
211118 9/1986 Japan.

Primary Examiner—Henry A. Bennet
Attorney, Agent, or Firm—Browdy & Neimark

[57] ABSTRACT

In the air circulation system for thermostatic chamber, a plurality of circulation ports are provided in the thermostatic chamber near the door and an intake port is formed in the wall of the chamber opposite the door. A plurality of air shutters installed in air ducts are controlled to be opened and closed in response to the opening and closing of the door. Control of various components of the system is performed as follows. When the door is open, hot air is blown out from the circulation ports on one side of the chamber and then drawn into the circulation ports on the other side, thus forming a powerful air curtain at the door portion of the chamber. When the door is closed, the hot air is blown out from the circulation ports on both sides of the chamber into the thermostatic chamber and then drawn into the intake port. In this way the hot air is circulated to keep the interior of the chamber warm. Furthermore, when the door is open, the amount of fuel and combustion air supplied to the burner is increased to operate the burner at the maximum capacity, and at the same time the hot air circulation blower is powered up to deliver the maximum amount of hot air.

9 Claims, 4 Drawing Sheets

AIR CIRCULATION SYSTEM FOR THERMOSTATIC CHAMBER

BACKGROUND OF THE INVENTION

1. Field of the Invention

This invention relates to an air circulation system for thermostatic chambers.

2. Description of the Prior Art

There are available conventional burner apparatuses for thermostatic chambers mounted on vehicles, such as one disclosed in the Japanese Patent Application Laid-Open No. 211118/1986. This burner apparatus is described below by referring to FIGS. 6 and 7.

In FIG. 6 showing the burner apparatus 60 for the vehicle's thermostatic chamber, an intake manifold of the internal combustion engine 61 and an air cleaner 63 are connected through an air intake pipe 62. There is a bypass pipe 64 installed in the middle of the air intake pipe 62. The bypass pipe 64 is connected to a burner 65, downstream of which is installed a heat exchanger 66. Air heated by the heat exchanger 66 is supplied through a supply pipe 69 and discharged from a hot air blowing outlet 68 into the thermostatic chamber 67.

FIG. 7 shows the outline of the burner apparatus 60 for the vehicle's thermostatic chamber. External air is taken in from the air intake port and introduced through the air cleaner 63 and a blower 77 and then through an air intake port 79 into the heat exchanger 66 where it is heated by hot gas from the burner 65. The heated air is now delivered from an air delivery outlet 80 into the supply pipe 69. The burner 65 has an atomizing plug 75 connected to a fuel supply device 74, and a firing plug 76. A controller 70 receives a temperature signal from a temperature sensor 78 in the thermostatic chamber 67 to control the burner 65. In the figure, reference numeral 71 denotes an operation switch of the controller 70, 72 a battery, 73 a fuel tank, and 81 a blower.

The burner apparatus for the vehicle's thermostatic chamber using the abovementioned heat exchanger as shown in FIGS. 6 and 7 can quickly atomize the liquid fuel and burn it by means of ignition the rapid atomizing system and the rapid ignition system to efficiently heat the circulating air by the burning gas and supply clean hot air with no burned gas contained into the chamber. The burner apparatus, however, has yet to be improved with respect to the ability to effectively and powerfully blow the hot air into the thermostatic chamber, increase the amount of circulating air, maintain a uniform temperature distribution in the chamber, and prevent reduction in temperature in the chamber as a result of the hot air escaping from the chamber when the door is open.

SUMMARY OF THE INVENTION

The object of this invention is to solve the above problems. That is, it is the primary object of this invention to provide an air circulation system for thermostatic chamber, in which a burner using liquid fuel produces hot burning gas, a heat exchanger quickly heats the circulation air by the hot gas to produce clean hot air with no exhaust gas contained, the hot air is circulated into the thermostatic chamber mounted on the vehicle to keep the interior of the chamber warm; and in which when the door of the chamber is open, the hot air is forcibly blown out from near the door to create an air curtain to prevent the warm air inside from escaping through the open door and cold external air from entering the chamber, thereby preventing the load in the chamber from getting cool.

Another object of the invention is to provide an air circulation system for thermostatic chamber, in which a plurality of circulation ports are formed on both sides of the thermostatic chamber near the door, the thermostatic chamber being kept warm by circulating hot air generated by a heat exchanger; in which when the door is open, the hot air is blown out from the circulation ports on one side of the thermostatic chamber and drawn into the circulation ports on the other side; and in which when the door is closed, the hot air is controlled to blow out from the circulation ports on both sides into the chamber to keep the interior of the chamber at a specified temperature and thereby prevent foods such as bread and vegetables from getting cool below a certain temperature.

Still another object of the invention is to provide an air circulation system for thermostatic chamber, in which air shutters are installed in air ducts that connect the circulation ports in the thermostatic chamber with the heat exchanger; and in which the air shutters are controlled to be opened or closed in response to the opening and closing of the door so as to change the circulation path of the hot air heated by the heat exchanger.

A further object of the invention is to provide an air circulation system for thermostatic chamber, in which when the door of the thermostatic chamber is open, the amount of fuel and combustion air supplied to the burner is increased to operate the burner at the maximum capacity and the hot air circulation blower is controlled to operate at its maximum capacity to deliver the maximum volume of hot air into the thermostatic chamber; and in which when, for example, the door is opened to load or unload goods to and from the thermostatic chamber, the maximum volume of hot air is blown out to form a powerful air curtain at the entrance opening of the thermostatic chamber to prevent the warm air in the chamber from escaping to the outside or external cold air from entering the chamber, thus keeping the interior of the chamber at a specified temperature, so that foods such as lunches and bread in the thermostatic chamber are prevented from getting cool below a specified temperature and maintained at a desirable state while being stored or transported in the chamber.

A further object of the invention is to provide an air circulation system for thermostatic chamber, in which the burner mounted on the vehicle can be operated independently of the vehicle engine so that when the vehicle is parked and the engine is at rest, the goods in the chamber can be kept at a desired temperature; and in which the burner and the heat exchanger are located at an appropriate position outside the chamber in terms of safety so that they are not exposed to fire hazards and to exhaust gases.

A further object of the invention is to provide an air circulation system for thermostatic chamber, in which when the thermostatic chamber is closed, the hot air is blown from the circulation ports on both sides into the chamber, so that the goods in the chamber can rapidly be warmed to and maintained at a desired temperature; and in which the hot air in the chamber is then drawn into the intake port formed in the chamber for further circulation.

A still further object of the invention is to provide an air circulation system for thermostatic chamber, in which a door switch is provided in the thermostatic chamber to detect the opening or closing of the door of the chamber; and in which the air shutters are controlled by a controller to be closed or opened quickly in response to a signal from the door switch and the burner operation is also controlled in such a manner that when the door is open, the hot air circulation blower is operated to its capacity to maximize the effect of the air curtain, thus achieving a good response to the door operation.

DETAILED DESCRIPTION OF THE EMBODIMENT

An air circulation system for thermostatic chamber according to this invention will now be described in detail by referring to the accompanying drawings.

Figure 1:
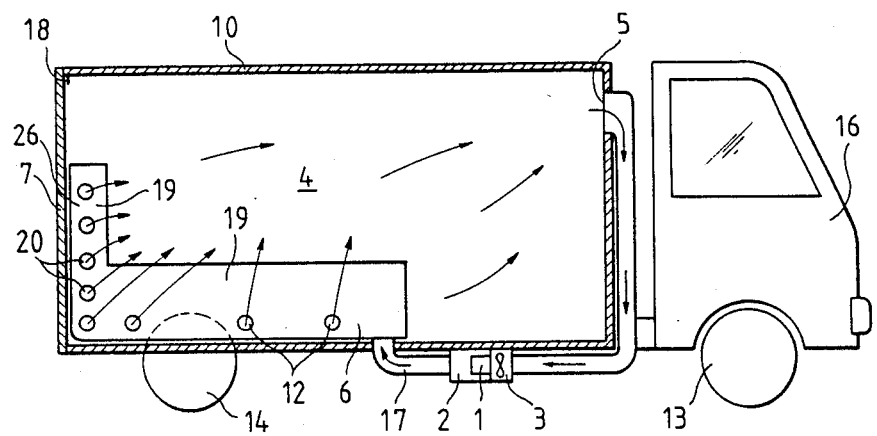
FIG. 1 is a side view of a vehicle on which an air circulation system for thermostatic chamber as one embodiment of this invention is mounted.
Figure 2:
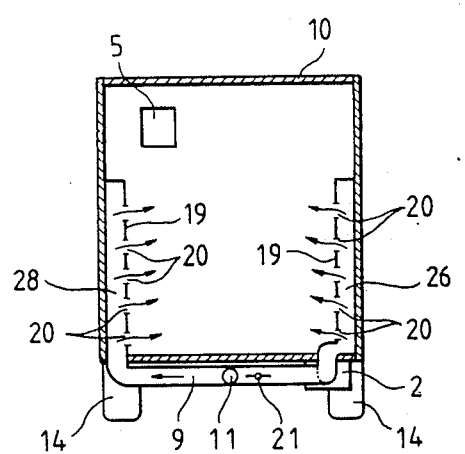
FIG. 2 is a rear view of the vehicle of FIG. 1.

FIG. 1 shows one embodiment of this invention, in which the air circulation system according to this invention is applied to a thermostatic chamber 10. FIG. 1 is a side view of a vehicle having a thermostatic chamber 10 equipped with the air circulation system of this invention and a cab 16. FIG. 2 is a rear view of the vehicle of FIG. 1. The air circulation system for thermostatic chamber consists of: the thermostatic chamber 10; a hot air generator installed on the vehicle under and outside of the thermostatic chamber 10 and which is communicated with the thermostatic chamber through air ducts; and a controller (not shown) that controls the hot air generator and air shutters installed in the air ducts. The hot air generator consists of a burner 1, a heat exchanger 2, a blower 3 for circulating hot air, a blower for supplying air for combustion, and a fuel pump for supplying fuel, and has a function of quickly generating hot air. In the vehicle-use heating equipment incorporating the air circulation system for thermostatic chamber, external air which is directly taken in or through the air cleaner installed on the vehicle is introduced by the blower from the air intake pipe into the burner 1. The burned gas in the burner 1 is supplied to the heat exchanger 2 installed downstream of the burner 1. In the heat exchanger 2 the circulating air is heated by the burned gas and then supplied through air ducts to a plurality of circulation ports 12, 20 from which the hot air enters into the interior 4 of the thermostatic chamber 10 to keep the interior 4 warm. This vehicle-use heating equipment can be applied to storage or transport of foods such as bread and lunches or perishable foods such as vegetables loaded in the container kept at a certain temperature. It is also applied to heating the interior 4 of the thermostatic chamber. In the figures the vehicle-use heating equipment is shown applied to a vehicle which mounts the thermostatic chamber 10 covered with insulating walls. Between front wheels 13 and rear wheels 14 is mounted the hot air generator which consists of a burner 1, a blower (not shown) for supplying combustion air to the burner 1, a heat exchanger 2, and a blower 3 for hot air circulation. Installed downstream of the heat exchanger 2 are air ducts 6, 8 leading to the circulation ports 12, 20, through which hot air is supplied into the thermostatic chamber 10. The air ducts 6, 8 are located t the lower part of the thermostatic chamber 10. The air ducts 6, 8 communicate with the circulation ports 12 formed in the side walls of the thermostatic chamber 10 on each side and with a number of circulation ports 20 formed in the rear portions of the side walls. The circulation ports 12 in the side walls are arranged in the longitudinal direction at the lower portion of the thermostatic chamber 10. The thermostatic chamber 10 has a door switch 18 at a door mount, a sensor that detects when the door 7 is opened or closed. At the rear portions of the opposing side walls, air ducts 26, 28 are formed by double walls—an outer wall and an inner wall 19—as shown in FIG. 2. A plurality of circulation ports 20 are formed in the inner wall 19 close to the door 7 and arranged in the direction of height. Though not shown, a temperature sensor is provided in the thermostatic chamber 10 to detect the temperature in the chamber.

Figure 3:
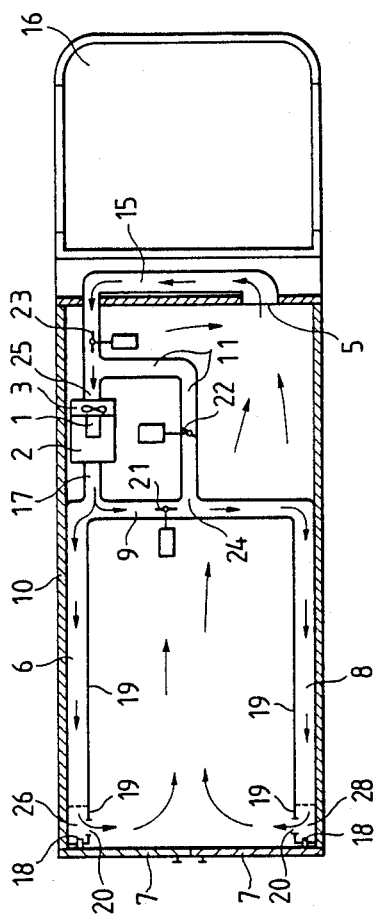
FIGS. 3 and 4 are bottom views of the vehicle of FIG. 1.
Figure 4:
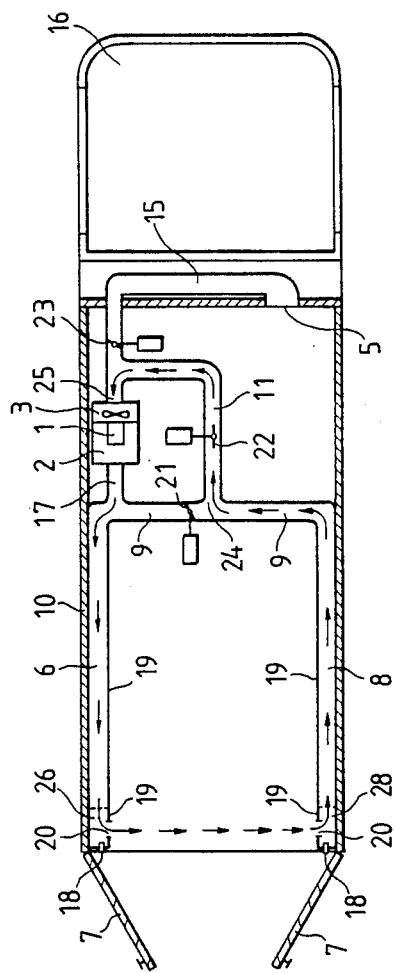

Next, we will explain the arrangement of the air ducts that comprise the air circulation system for thermostatic chamber of this invention, by referring to FIGS. 3 and 4 in particular. FIGS. 3 and 4 are bottom views of the vehicle, in which the air ducts are shown schematically to clearly show the flow of hot air. In the hot air generator installed on one side of the vehicle under the thermostatic chamber 10, the hot air delivery duct 17 of the heat exchanger 2 is branched to communicate with the air duct 6 formed by the wall surface on one side of the thermostatic chamber 10 and with the air duct 8 formed by the wall surface on the other side. The hot air delivery duct 17 also communicates with an air duct 9 which extends laterally in the direction of vehicle width. Hot air is therefore supplied to these air ducts. The air ducts 6, 8 extend along the wall surfaces of the thermostatic chamber 10 to the rear ends thereof and communicate with the air ducts 26, 28 which vertically rise on each side of the chamber 10 near the door 7. The air ducts 26, 28 communicate with a plurality of circulation ports 20. The thermostatic chamber 10 has an intake port 5 formed in the upper portion of the front wall. The intake port 5 is connected with an air duct 15 for hot air circulation, which in turn is connected to an air intake duct 25 for the blower 3 of the hot air generator. The air duct 9, which connects the hot air delivery duct 17 of the hot air generator with the air duct 8 formed along the wall surface on one side of the thermostatic chamber 10, has hot air circulation duct 11 connected to an intermediate portion 24 thereof. The air duct 11 is also connected to the air intake duct 25. In this arrangement of air ducts, an air shutter 21 is installed in that portion of the air duct 9 ranging from the hot air delivery duct 17 to the intermediate portion 24. In the hot air circulation duct 11 an air shutter 22 is installed; and still another air shutter 23 is installed in the hot air circulation duct 15. These air shutters 21, 22, 23 are opened and closed by hydraulic or solenoid actuators. The open and close operation of these shutters are controlled by the controller so that they are operated in response to the operation of the door sensor 18 which is turned on or off by the opening and closing of the door 7. It is also possible to control the open and close operation of the air shutters 21, 22, 23 according to the operation of a switch provided near the driver's seat or the door 7. That is, the operation of the air shutters 21, 22, 23 is controlled by the controller in response to the opening and closing of the door 7 thereby changing the hot air circulation path.

One example of the burner 1 is explained. The burner 1 consists of a combustion cylinder which is divided into an atomizing chamber and a combustion chamber by a partition plate formed with air communication openings. A vaporizer with a built-in atomizing glow plug is installed in the burner in such a way as to pass through the combustion chamber. The vaporizer has a nozzle for jetting the fuel vapor, the nozzle being opened in the atomizing chamber. An ignition glow plug is installed in the atomizing chamber. A fuel pump supplies liquid fuel into the vaporizer where the atomizing glow plug vaporizes the liquid fuel. At the same time the vaporizer takes in combustion air to generate a mixture of fuel vapor and air. The ignition glow plug ignites small drops of fuel or air-fuel mixture to burn the fuel in the combustion chamber. In such a burner 1, the liquid fuel is quickly atomized and fired, permitting rapid combustion of fuel. As a result, the burner 1 can immediately send the hot gas into the heat exchanger 2 where the circulation air is quickly heated so that the interior of the thermostatic chamber is rapidly warmed.

Figure 5:
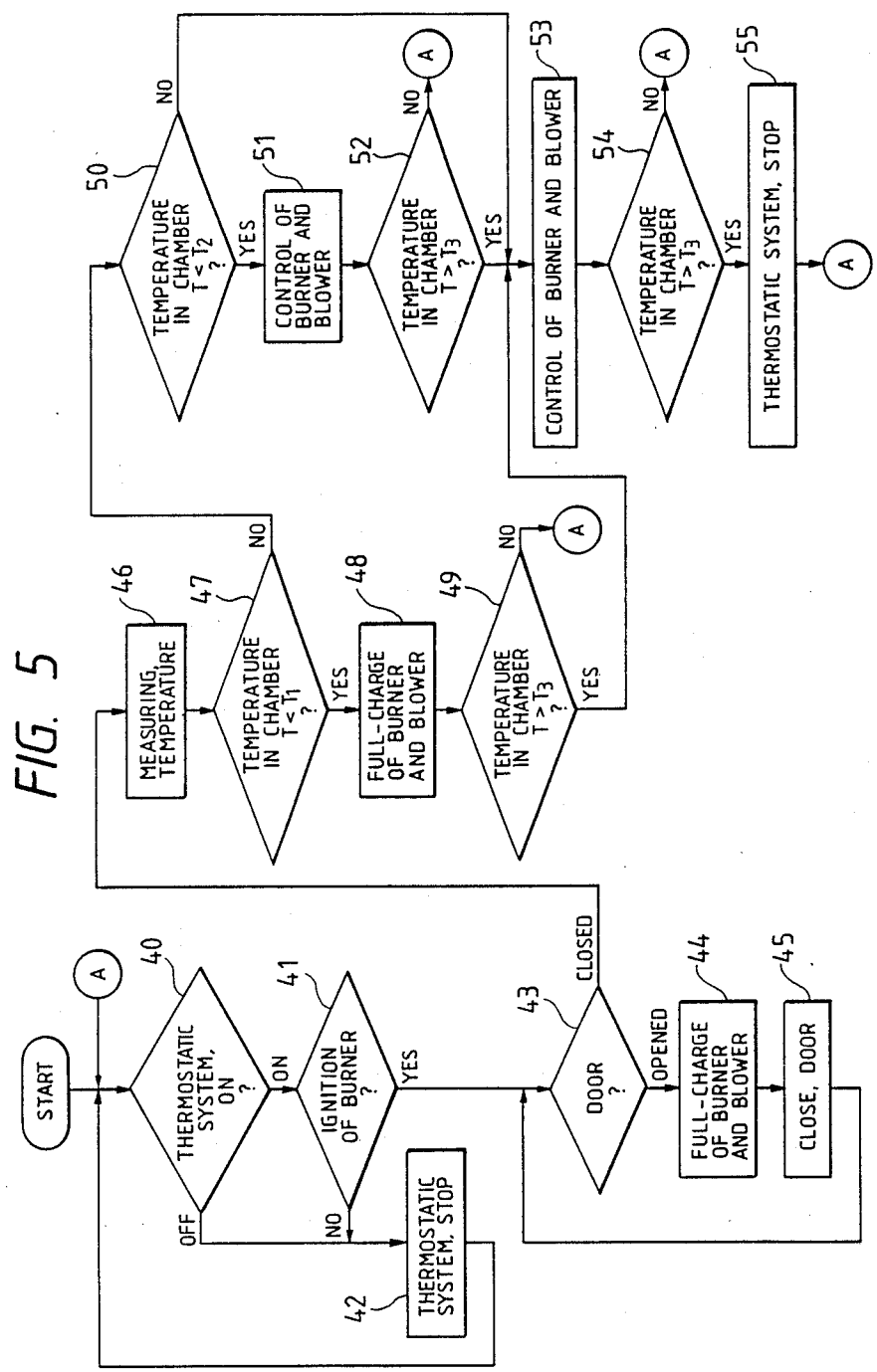
FIG. 5 is a flowchart showing a sequence of operations of the air circulation system for thermostatic chamber of this invention.
Figure 6:
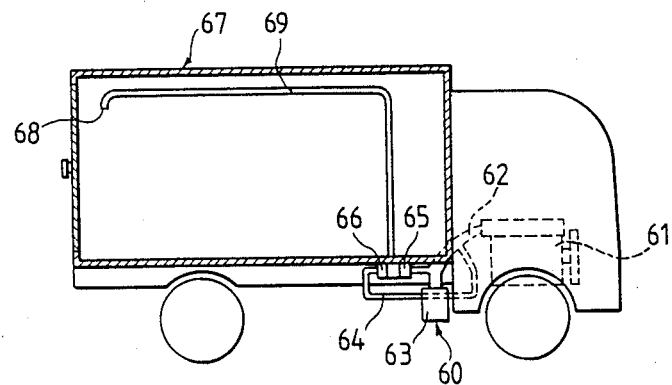
FIG. 6 is a side view of a conventional thermostatic chamber mounted on a vehicle.
Figure 7:
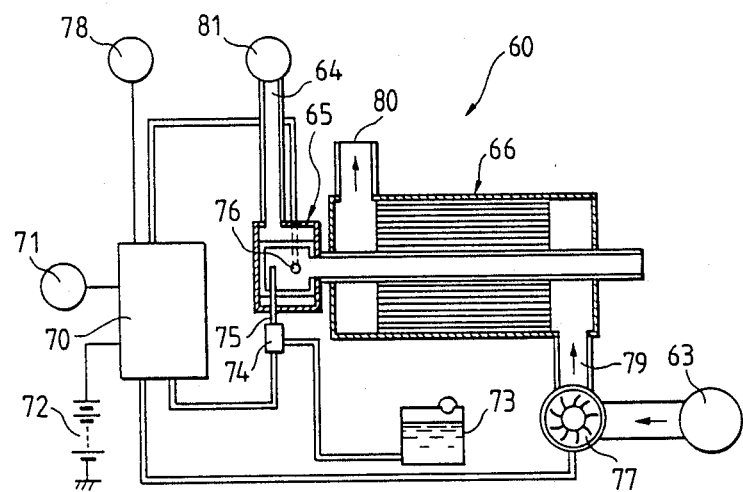
FIG. 7 is an explanatory view showing a burner device used on the vehicle-use thermostatic chamber of FIG. 6.

The air circulation system for thermostatic chamber according to this invention has a construction mentioned above. Now, the operation of this system will be explained by referring to FIGS. 3, 4 and 5 in particular. The following explanation, however, describes only the controller operation in delivering the hot air, and those for other functions are omitted here.

First, it is checked whether the air circulation system for thermostatic chamber of this invention is to be activated or not (step 40). When it is decided that the system should be activated, the air circulation system operation switch is turned on. When it is not necessary to operate the system, the switch is turned off (step 42). When the air circulation system for thermostatic chamber is to be operated to activate the hot air generator and deliver hot air into air ducts, the operation switch is turned on to activate the burner 1 of the hot air generator. That is, the fuel pump is activated to supply liquid fuel into the vaporizer and the atomizing glow plug of the vaporizer is turned on to atomize the liquid fuel. At the same time, the combustion air supply blower is operated to introduce air into the burner 1, which then ignites the atomized fuel by the ignition glow plug. After ignition, it is checked by a flame sensor whether the burner 1 is operating or not (step 41). When the burner is found not operating, the hot air generator may be faulty, so that the air circulation system operation switch is turned off to stop the system, permitting the burner 1 to be checked and repaired (step 42). When the fuel is ignited and the burner 1 is burning fuel, the hot air circulation blower 3 is operated to introduce the circulating air from the inlet port of the heat exchanger 2, which delivers hot air from outlet port into the air ducts 6, 8. Then it is checked by the door sensor 18 or by the manual switch operated by a driver whether the door 7 of the thermostatic chamber 10 is open or closed (step 43).

When the door 7 of the thermostatic chamber 10 is open, the fuel pump for the burner 1 is operated to increase the amount of fuel supplied to the burner 1 so that the hot air generator can deliver the maximum volume of hot air. At the same time, the combustion air supply blower is powered up to increase the amount of combustion air, operating the burner 1 at the maximum burning capacity, and the hot air circulation blower 3 is controlled to operate at its maximum capacity (step 44). In this case, the air shutters 21, 22, 23 of the air circulation system for thermostatic chamber are controlled by the controller so that the air shutters 21 and 23 are closed with the air shutter 22 open, as shown in FIG. 4. Then the hot air flows as indicated by arrows in FIG. 4. That is, the hot air produced by the hot air generator flows through the hot air delivery duct 17 and the air duct 6 along the wall surface of the thermostatic chamber 10 on one side. It then flows out of the circulation ports 20 formed in the air duct 26 near the door 7 into the thermostatic chamber 10. The hot air blown out into the thermostatic chamber 10 is then drawn into the air duct 28 on the other side of the chamber 10 through the circulation ports 20 formed in the air duct 28. The hot air then flows from the air duct 28 to the air duct 8, which extends along the wall surface of the chamber 10 on the same side as the air duct 28. It further flows through the air duct 9 and the hot air circulation duct 11 into the air intake duct 25 and the blower 3 of the hot air generator. While the door 7 of the thermostatic chamber 10 is open, this operation state is maintained. When the door 7 is switched (step 45), i.e., the door 7 is closed, the processing returns to step 43.

When the state of the door 7 of the thermostatic chamber 10 is detected by the door sensor 18 and the door is found to be closed, the air shutters 21, 22, 23 of the air circulation system for thermostatic chamber are controlled by the controller so that, as shown in FIG. 3, the air shutters 21 and 23 are opened and the air shutter 22 is closed. This causes the hot air to flow as shown by arrows of FIG. 3. That is, the hot air generated by the heat exchanger 2 is supplied from the hot air delivery duct 17 to the air duct 6 running along the wall surface on one side of the thermostatic chamber 10 and to the air duct 9 from which the hot air is further supplied to the air duct 8 along the wall surface on the other side of the thermostatic chamber 10. Then, the hot air flows out into the interior 4 of the thermostatic chamber 10 through the circulation ports 20 that are formed on the air ducts 26, 28 arranged on the side walls of the chamber 10 near the door 7. The hot air blown into the chamber interior 4 is drawn into the intake port 5 formed in the front wall of the chamber 10 and then fed through the hot air circulation duct 15 and the air intake duct 25 into the blower of the hot air generator.

When the door 7 of the thermostatic chamber 10 is closed, the hot air generator is controlled by the controller, as follows, to control the temperature of the hot air blown into the interior 4 of the thermostatic chamber 10.

First, the temperature T of the hot air blowing out from the circulation ports 12, 20 is measured by a temperature sensor installed in the interior 4 of the thermostatic chamber 10 (step 46). A check is made whether or not the temperature T in the chamber interior 4 is lower than a specified temperature Tl (say, 10° C.) (step 47). When the temperature inside the chamber is lower than the specified temperature, the fuel pump for the burner 1 is operated to increase the amount of fuel supplied to the burner 1 so that the maximum amount of hot air can be delivered from the heat exchanger 2 to the chamber interior 4. At the same time, the combustion air supply blower is operated at an increased capacity to increase the amount of combustion air supplied to the burner 1 so that the burner 1 operates at the maximum capacity. Also the hot air circulation blower 3 is controlled to operate at its maximum capacity (step 48). Next, after a specified period, the temperature T in the chamber interior 4 is measured again. It is checked whether or not the temperature T in the chamber interior 4 is lower than a specified temperature T3 (say, 18° C.) (step 49). When it is higher than the specified temperature, the processing goes to step 53. When the temperature in the chamber interior 4 does not rise despite the hot air generator operating at its maximum capacity, there is a possibility of the burner 1 not operating. Then the processing returns to the initial step 40.

When the temperature T in the chamber interior 4 is higher than the specified temperature T1 (say, 10° C.), it is further checked whether or not the temperature T is lower than a specified temperature T2 (say, 15° C.) (step 50). When the chamber temperature is found to be lower than the specified temperature T2, then the chamber needs only a slight temperature increase and the rate of producing the hot air by the hot air generator is slightly decreased. This is accomplished by setting the amount of fuel supplied by the fuel pump to an intermediate volume, controlling the operation of the burner 1 at the intermediate range, and controlling the power of the hot air circulation blower 3 to an intermediate range so that the amount of hot air generated by the hot air generator which is supplied through the air ducts and blown from the circulation ports 12, 20 will reduce to an intermediate range (step 51). After a specified period of time, the temperature T in the chamber interior 4 is again measured to see if the inside temperature is higher than a specified temperature T3 (say, 18° C.) (step 52). When the inside temperature is higher than the specified temperature T3, the processing proceeds to step 53. If the temperature in the chamber interior 4 fails to increase when the hot air generator is operating at the intermediate capacity, the burner 1 may be failed, so that the processing returns to the initial step 40. As the inside temperature T increases and becomes higher than the specified temperature T3 (say, 18° C.), the power of the hot air circulation blower 3 is lowered; the amount of fuel delivered from the fuel pump is reduced to mitigate the burning power of the burner 1; and the combustion air supply blower is reduced in power to reduce the amount of combustion air supplied to the burner so as to reduce the amount of hot air generated by the hot air generator (step 53). After a specified period of time, the temperature T in the chamber interior 4 is measured again to check whether the inside temperature T is higher than the specified temperature T3 (say, 18° C.) (step 54). When the inside temperature T is higher than the specified temperature T3, the air circulation system operation switch is turned off to temporarily stop the hot air generator and therefore the air circulation system for thermostatic chamber (step 55). And if the interior 4 of the thermostatic chamber 10 is to be kept at the specified temperature T3 (say, 18° C.), the processing returns to the initial step 40. At step 54, when the inside temperature T decreases below the specified temperature T3 (say, 18° C.), the processing also returns to the initial step 40.

Although one particular embodiment of this invention has been described in the foregoing, it should be noted that this invention is not limited to the details of this embodiment and that various modifications may be made without departing the spirit of the invention. For example, while in the embodiment only one hot air generator is provided, two or more hot air generators may be used. The intake port 5 and the hot air circulation duct 15 in the vehicle, which consists of the cab 16 and the thermostatic chamber 10, are formed between the cab 16 and the thermostatic chamber 10. They may be formed in the side wall of the thermostatic chamber 10. It is also possible to provide fans to the circulation ports 20 on the rear part of the side walls to forcibly blow out or draw in the hot air from the air duct into the chamber interior 4. While the door 7 is provided at the rear end of the vehicle in the embodiment, it may be provided at the side walls of the chamber. In that case, the circulation ports must, of course, be provided to the side walls on each side of the door. Further, it is possible to provide the circulation ports for blowing out the hot air at the lower part of the thermostatic chamber 10 and the circulation ports for drawing in the hot air at the upper part of the chamber so as to cause the hot air to flow from the bottom upward, improving the air curtain effect. As to the power supply for the hot air generator, i.e., for the burner 1, heat exchanger 2, blower 3, and controller that controls these, it is possible to make them switchable between a direct current power source such as a battery, generator and motor mounted on the vehicle and an alternating current power source for home and office use. It should also be noted that the location, size and shape of the circulation ports and of the intake port may be appropriately changed according to the kind and size of the load in the thermostatic chamber or to shelves formed inside the chamber. The arrangement of the hot air generator consisting of the blower, heat exchanger, burner, etc. and the arrangment of the air ducts are not limited to those of the embodiment. For example, they may be installed at the rear side portions of the vehicle behind the rear wheels. In large trucks or flat and low vehicles, the hot air generator may also be mounted on the roof. In large trucks consisting of a cab and a load container, the hot air generator may be installed at the upper portion between the cab and the container, i.e., on the roof. Furthermore, as to the humidity in the container, it is possible to install an ultrasonic humidifier and a humidity sensor to regulate the humidity in relation to the temperature when the loads in the chamber are perishable foods such as vegetables.

What is claimed is:

1. An air circulation system for thermostatic chamber, comprising:
    a thermostatic chamber mounted on a vehicle, the thermostatic chamber having a door, a plurality of circulation ports provided to opposing walls of the chamber near the door and opening in the chamber, and an intake port provided to a wall of the chamber opposite to the door;
    a door sensor installed in the thermostatic chamber to detect the closed or open state of the door;
    a temperature sensor installed in the thermostatic chamber to detect the temperature in the chamber;
    a burner installed on the vehicle;
    a heat exchanger mounted on the vehicle and having an inlet port and an outlet port, the heat exchanger being adapted to heat the air drawn in from the inlet port by using the hot burned gas produced by the burner and deliver the heated air from the outlet port;

a first air duct to communicate the outlet port of the heat exchanger with the circulation ports provided on the wall of the thermostatic chamber on one side;

a second air duct to communicate the outlet port of the heat exchanger with the circulation ports provided on the wall of the thermostatic chamber on the other side; and a first air shutter installed in the second air duct, the first air shutter being adapted to open the second air duct in response to a door-closed signal from the door sensor and close the second air duct in response to a door-open signal from the door sensor;

a third air duct to communicate the second air duct with the inlet port of the heat exchanger; and a second air shutter installed in the third air duct, the second air shutter being adapted to close the third air duct in response to a door-closed signal from the door sensor and open the third air duct in response to a door-open signal from the door sensor;

a fourth air duct to communicate the intake port of the thermostatic chamber with the inlet port of the heat exchanger; and a third air shutter installed in the fourth air duct, the third air shutter being adapted to open the fourth air duct in response to a door-closed signal from the door sensor and close the fourth air duct in response to a door-open signal from the door sensor; and a blower to circulate the hot air heated by the heat exchanger through the first, second, third and fourth air ducts into the thermostatic chamber.

2. An air circulation system for thermostatic chamber as set forth in claim 1, wherein the door is installed at the rear part of the thermostatic chamber on the vehicle and the intake port of the thermostatic chamber is provided in the front part of the thermostatic chamber.

3. An air circulation system for thermostatic chamber as set forth in claim 1, wherein the circulation ports provided at the opposing walls of the thermostatic chamber near the door are formed in large numbers in both side walls of the thermostatic chamber and arranged parallelly in the direction of vehicle height.

4. An air circulation system for thermostatic chamber as set forth in claim 1, wherein the circulation ports provided at the opposing walls of the thermostatic chamber near the door are formed in large numbers in a top wall and a bottom wall of the thermostatic chamber and arranged parallelly in the direction of vehicle width.

5. An air circulation system for thermostatic chamber as set forth in claim 1, wherein the first air duct and the second air duct are arranged on the side walls of the thermostatic chamber.

6. An air circulation system for thermostatic chamber as set forth in claim 1, wherein the burner has a fuel supply means to supply fuel to the burner and a combustion air supply means to supply air to the burner for combustion.

7. An air circulation system for thermostatic chamber as set forth in claim 6, wherein when the door is open, a control is performed in such a way that the amount of fuel fed to the burner by the fuel supply means is increased, the amount of combustion air fed to the burner by the combustion air supply means is increased, the burning capacity of the burner is increased to the maximum, and the amount of hot air delivered by the blower is increased to the maximum so that the maximum volume of hot air will be delivered from the outlet port of the heat exchanger.

8. An air circulation system for thermostatic chamber as set forth in claim 6, wherein the amount of fuel and combustion air supplied to the burner is controlled by the fuel supply means and the combustion air supply means according to the temperature in the thermostatic chamber as detected by the temperature sensor installed in the chamber, so as to control the temperature in the chamber at a specified value.

9. An air circulation system as set forth in claim 1, wherein the burner and the blower mounted on the vehicle are made operable independently of the operation of the vehicle engine.

* * * * *